United States Patent [19]

Dwyer et al.

[11] 4,375,458

[45] Mar. 1, 1983

[54] SYNTHESIS OF LARGE CRYSTALLITE ZEOLITES

[75] Inventors: Francis G. Dwyer, West Chester, Pa.; Pochen Chu, West Deptford; William E. Cormier, Jr., Clarksboro, both of N.J.

[73] Assignee: Mobil Oil Corporation, New York, N.Y.

[21] Appl. No.: 304,725

[22] Filed: Sep. 23, 1981

Related U.S. Application Data

[60] Division of Ser. No. 949,461, Oct. 10, 1978, abandoned, which is a continuation-in-part of Ser. No. 825,369, Aug. 17, 1977, abandoned.

[51] Int. Cl.$^3$ .............................................. C01B 33/28
[52] U.S. Cl. .................................. 423/329; 260/448 C
[58] Field of Search .............................. 423/328–330; 260/448 C; 252/431 N, 455 Z

[56] References Cited

U.S. PATENT DOCUMENTS

| | | | |
|---|---|---|---|
| 3,702,886 | 11/1972 | Argauer et al. | 423/328 |
| 3,832,449 | 8/1974 | Rosinski et al. | 423/329 X |
| 3,849,463 | 11/1974 | Dwyer et al. | 423/429 X |
| 3,904,738 | 9/1975 | Bobson | 423/328 |
| 3,941,871 | 3/1976 | Dwyer et al. | 423/328 |
| 4,025,571 | 5/1977 | Lago | 423/328 X |

FOREIGN PATENT DOCUMENTS 1345363  1/1974  United Kingdom ............... 423/328

*Primary Examiner*—Edward J. Meros
*Attorney, Agent, or Firm*—Charles A. Huggett; Michael G. Gilman; Howard M. Flournoy

[57] ABSTRACT

The invention provides a method of making large crystallite zeolites by a method comprising forming the zeolite in a medium containing a combination of two different alkylammonium cations or a combination of an alkylammonium cation and a metallic cation. In the combination at least one of the cations will have an ionic radius of from about 1.40 to the pore size of the specific zeolite.

10 Claims, No Drawings

SYNTHESIS OF LARGE CRYSTALLITE ZEOLITES

CROSS REFERENCE TO RELATED APPLICATIONS

This application is a division of U.S. application Ser. No. 949,461, filed Oct. 10, 1978, which in turn is a continuation-in-part of U.S. application Ser. No. 825,369, filed Aug. 17, 1977, both abandoned.

BACKGROUND OF THE INVENTION

1. Field of the Invention

The invention relates generally to the synthesis of zeolites. More particularly, it relates to the synthesis of certain zeolites having large-crystal structures.

2. Discussion of the Prior Art

Zeolitic materials, both natural and synthetic, have been known in the past to have catalytic capability for various types of hydrocarbon conversion reactions. Certain of these zeolitic materials comprising ordered porous crystalline aluminosilicates have a definite crystalline structure, as determined by X-ray diffraction, within which there are a number of small cavities which are interconnected by a number of still smaller channels. These cavities and channels are precisely uniform in size within a specific zeolitic material. Since the dimensions of these pores are such as to accept for adsorption purposes molecules of certain dimensions while rejecting those of larger dimension, these materials have commonly been known to be "molecular sieves" and are utilized in a variety of ways to take advantage of the adsorptive properties of these compositions.

Crystalline aluminosilicates have been characterized by the presence of aluminum and silicon, the total of such atoms to oxygen being 1:2. The amount of alumina present in conventional aluminosilicates appears directly related to acidity characteristics of the resulting product. Low alumina content is advantageous in attaining low acidity, desirable for low coking and low aging rates.

U.S. Pat. No. 3,941,871 discloses the preparation of a ZSM-5 type zeolite having a high $SiO_2$ to $Al_2O_3$ ratio. The disclosure of this patent includes a teaching of the combined use of TPA and TMA to make a crystalline metal organosilicate. U.S. Pat. No. 3,849,463 discloses a method of decreasing silica occlusion in a zeolite having a $SiO_2/Al_2O_3$ ratio of greater than 6 by incorporating in the reaction mixture an alkali metal salt.

SUMMARY OF THE INVENTION

In accordance with the present invention, there is disclosed a method of preparing a crystalline zeolite having a $SiO_2$ to $Al_2O_3$ molar ratio of from about 25 to about 1000 and having a crystal size at least $1\mu$, the method comprising having in the reaction mixture (1) a combination comprising two different alkylammonium cations or (2) a combination comprising an alkylammonium cation and a metallic cation, wherein in combination (1) at least one of the alkylammonium cations and in combination (2) at least the metallic cations have an ionic radius of from 1.40 Å to the pore size of the specific zeolite. Preferably this will be a combination of TPA and a member selected from the group consisting of TMA, TEA, cesium and rubidium cations. The mixture may also have therein added alkali or alkaline earth metals. Preferably, the $SiO_2$ to $Al_2O_3$ ratio will be from about 25 to about 300.

DESCRIPTION OF SPECIFIC EMBODIMENTS

The present invention will be applicable to the preparation of the ZSM-5 type zeolite. That is to say, although the zeolites of the invention have very high $SiO_2$ to $Al_2O_3$ ratios, the product is still zeolitic and will have the crystalline structure of the indicated zeolites.

Although they have low alumina contents, i.e., high silica to alumina ratios, they are very active even when the silica to alumina ratio exceeds 25. The activity is surprising since catalytic activity is generally attributed to framework aluminum atoms. These catalysts retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity. In many environments, the zeolites of this class exhibit very low coke forming capability, conducive to very long times on stream between burning regenerations.

An important characteristic of the crystal structure of the ZSM-5 type of zeolites is that they provide constrained access to, and egress from, the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline zeolite. Briefly, the preferred type catalysts useful in this invention possess, in combination, a silica to alumina ratio of at least about 25, and a structure providing constrained access to the crystalline free space.

The silica to alumina ratio referred to may be determine by conventional analysis. This ratio is meant to represent, as closely as possible, the ratio in the rigid anionic framework of the zeolite crystal and to exclude aluminum in the binder or in cationic or other form within the channels.

The type zeolites useful in this invention freely sorb normal hexane and have a pore dimension greater than about 5 Angstroms. In addition, the structure must provide constrained access to larger molecules. It is sometimes possible to judge from a know crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although, in some instances, excessive puckering or pore blockage may render these catalysts ineffective. Twelve-membered rings do not generally appear to offer sufficient constraint to produce the advantageous conversions, although puckered structures exist such as TMA offretite which is a known effective zeolite. Also, structures can be conceived, due to pore blockage or other cause, that may be operative.

Rather than attempt to judge from crystal structure whether or not a catalyst possesses the necessary constrained access, a simple determination of the "constraint index" may be made by passing continuously a mixture of an equal weight of normal hexane and 3-methylpentane over a small sample, approximately 1 gram or less, of catalyst at atmospheric pressure according to the following procedure. A sample of the catalyst, in the form of pellets or extrudate, is crushed to a particle size about that of coarse sand and mounted in a glass tube. Prior to testing, the catalyst is treated with a stream of air at 1000° F. for at least 15 minutes. The catalyst is then flushed with helium and the temperature adjusted between 550° F. and 950° F. to give an overall conversion between 10% and 60%. The mixture of hydrocarbons is passed at 1 liquid hourly space velocity (i.e., 1 volume of liquid hydrocarbon per volume of catalyst per hour) over the catalyst with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Catalysts suitable for the present invention are those having a constraint index in the approximate range of 1 to 12. Constraint Index (CI) values for some typical catalyst are:

| CAS | C.I. |
|---|---|
| ZSM-5 | 8.3 |
| ZSM-11 | 8.7 |
| ZSM-12 | 2 |
| ZSM-35 | 4.5 |
| Beta | 0.6 |
| ZSM-4 | 0.5 |
| H-Zeolon | 0.5 |
| REY | 0.4 |
| Amorphous Silica-Alumina | 0.6 |
| Erionite | 38 |

It is to be realized that the above constraint index values typically characterize the specified zeolites but that such are the cumulative result of several variables used in determination and calculation thereof. Thus, for a given zeolite depending on the temperature employed within the aforenoted range of 550° F. to 950° F., with accompanying conversion between 10% and 60%, the constraint index may vary within the indicated approximate range of 1 to 12. Likewise, other variables such as the crystal size of the zeolite, the presence of possibly occluded contaminants and binders intimately combined with the zeolite may affect the constraint index. It will accordingly be understood by those skilled in the art that the constraint index, as utilized herein, while affording a highly useful means for characterizing the zeolites of interest is approximate, taking into consideration the manner of its determination, with the probability, in some instances, of compounding variable extremes. However, in all instances, at a temperature within the above-specified range of 550° F. to 950° F., the constraint index will have a value for any given zeolite of interest herein within the approximate range of 1 to 12.

From the above list it is apparent that ZSM-5, ZSM-11, ZSM-12 and ZSM-35 zeolite structures are included in the invention. There is no need to present a full disclosure of these zeolites in this application since they are fully described elsewhere. Thus ZSM-5 is the subject of U.S. Pat. No. 3,702,886, ZSM-11 of U.S. Pat. No. 3,709,979, ZSM-12 of U.S. Pat. No. 3,832,449 and ZSM-35 of U.S. Pat. No. 4,016,245. Finally, while ZSM-38 is not in the above list, it is nonetheless included and is described in U.S. application Ser. No. 560,412, filed Mar. 20, 1975. So all these may be complete with respect to all the details of their preparation, their physical and chemical make-up and the like, the four patents and the application mentioned in this paragraph are hereby incorporated into this application by reference.

The specific zeolites described, when prepared in the presence of organic cations, are catalytically inactive, possibly because the intracrystalline free space is occupied by organic cations from the forming solution. They may however, be activated by calcining in air or an inert atmosphere for from 15 minutes to 24 hours at 400°–600° C. The calcined product may be given subsequent ion exchange with $NH_4$ salts or acids and subsequent calcination to further activate the catalyst.

The zeolites can be used either in another form, e.g., the ammonium form, the hydrogen form, or another univalent or multivalent cationic form. Preferably, one or the other of the last two forms is employed. They can also be used in intimate combination with a hydrogenating component such as tungsten, vanadium, molybdenum, rhenium, nickel, cobalt, chromium, manganese, or a noble metal such as platinum or palladium where a hydrogenation function is to be performed. Such component may be exchanged into the composition, impregnated therein or physically intimately admixed therewith. Such component can be impregnated in or on to the present catalyst such as, for example, by, in the case of platinum, treating the zeolite with a platinum metal-containing ion. Thus, suitable platinum compounds include chloroplatinic acid, platinous chloride and various compounds containing the platinum amine complex.

The compounds of the useful platinum or other metals can be divided into compounds in which the metal is present in the cation of the compound and compounds in which it is present in the anion of the compound. Both types which contain the metal in the ionic state can be used. A solution in which platinum metals are in the form of a cation or cationic complex, e.g., $Pt(NH_3)_6Cl_4$, is particularly useful. For some hydrocarbon conversion processes, this noble metal form of the catalyst is necessary.

The zeolite, when employed either as an absorbent or as a catalyst in one of the aforementioned processes, should be dehydrated at least partially. This can be done by heating to a temperature in the range of 200° to 600° C. in an atmosphere such as air, nitrogen, etc., and at atmospheric or subatmospheric pressures for between 1 and 48 hours. Dehydration can also be performed at lower temperatures merely by placing the catalyst in a vacuum, but a longer time is required to obtain a sufficient amount of dehydration.

The zeolites of the present invention can be prepared from a reaction mixture having the following composition, in terms of mole ratios of oxides:

| | Broad | Preferred | Particularly Preferred |
|---|---|---|---|
| $R_2O/SiO_2^{(1)}$ | 0.01–5 | 0.1–1 | 0.1–0.8 |
| $SiO_2/Al_2O_3$ | 25–1000 | 25–500 | 25–250 |
| $H_2O/OH$ | 50–1000 | 50–500 | 10–300 |
| $OH^-/SiO_2$ | 0.01–5 | 0.1–1 | 0.2–0.75 |

|  | Broad | Preferred | Particularly Preferred |
|---|---|---|---|
| $M_2O/R_2O^{(2)}$ | 0.1–50 | 0.5–10 | 1–10 |

(1) R is the alkylammonium cation
(2) M is the cation other than the alkylammonium (R) and sodium (Na) used.

These ranges apply to zeolites having the crystal structures of ZSM-5, ZSM-11, ZSM-12, ZSM-35 and ZSM-38. Typical reaction conditions include heating the above mixture at a temperature of from about 80° C. to about 200° C. for a period of time from, e.g., about 4 hours to about 30 days. As in the case of ZSM-5 aluminosilicate synthesis, the digestion of the gel particles is carried out until the crystalline zeolite forms completely. The product crystals are then separated, as by cooling and filtering, and are water washed and dried at from about 80° C. to about 150° C.

Members of the present family of zeolites can have other cations associated therewith. These may be any of a wide variety of other cations associated with the zeolite according to applicable techniques well known in the art. Typical cations will include hydrogen, ammonium and metal cations, including mixtures of the same. Of the metallic cations, particular preference is given to cations of metals such as rare earth metals, manganese and calcium as well as metals of Group II of the Periodic Table, e.g., zinc and Group VIII of the Periodic Table, e.g., nickel.

Typical techniques include impregnating or exchanging members of the family of zeolites with a salt of the desired cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251 and 3,140,253.

Following exchange with the salt solution of the desired cation, the zeolites are then preferably washed with water and dried at a temperature ranging from 150° F. to about 600° F. and thereafter calcined in air or other inert gas at temperatures ranging from about 500° F. to about 1500° F. for periods of time ranging from 1 to 48 hours or more.

Impregnation procedures are conventional. That is, the zeolite is contacted with a salt solution and is then dried and calcined as usual.

Regardless of the cations associated with the synthesized form of the catalyst, the spatial arrangement of the aluminum, silicon and oxygen atoms which form the basic crystal lattices in any given zeolite of this invention remains essentially unchanged by the described replacement of sodium or other alkali metal as determined by taking an X-ray powder diffraction pattern of the ion-exchanged material. For example, the X-ray diffraction pattern of several ion-exchanged ZSM-5 zeolites reveal a pattern substantially the same as that set forth in U.S. Pat. No. 3,702,886.

As in the case of many catalysts, it is desired to incorporate the catalyst of this invention with another material resistant to the temperatures and other conditions employed in organic conversion processes. Such materials include products such as the synthetic or naturally occurring zeolites, as well as inorganic materials such as clays, silica and/or metal oxides. The latter may be either naturally occurring or in the form of gelatinous precipitates or gels including mixtures of silica and metal oxides. Use of a material in conjunction with the present catalyst tends to improve the conversion and/or selectivity of the catalyst in certain organic conversion processes. Inactive materials suitably serve as diluents to control the amount of conversion in a given process so that products can be obtained economically and in orderly manner without employing other means for controlling the rate of reaction. Normally, zeolite materials have been incorporated into naturally occurring clays, e.g, bentonite and kaolin, to improve the crush strength of the catalyst under commercial operating conditions. These materials, i.e., clays, oxides, etc. function as binders for the catalyst. It is desirable to provide a catalyst having good crush strength, because in a petroleum refinery the catalyst is often subjected to rough handling, which tends to break the catalyst down into powder-like materials which cause problems in processing. The clay binders have been employed for the purpose of improving the crush strength of the catalyst.

Naturally occurring clays which can be composited with the catalyst include the montmorillonite and kaolin families which families include the sub-bentonites and the kaolins commonly know as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the catalyst can be composited with a porous matrix material such as silica-alumina, silica-magnesia, silica-zirconia, silica-thoria, silica-beryllia and silica-titania as well as ternary compositions such as silica-alumina-thoria, silica-alumina-zirconia, silica-alumina-magnesia and zilica-magnesia-zirconia. The matrix can be in the form of a cogel. The relative proportions of the finely divided crystal line aluminosilicate and inorganic oxide gel matrix vary widely with the crystalline aluminosilicate content ranging from about 1 to about 90 percent by weight and more usually, particularly when the composite is prepared in the form of beads, in the range of about 2 to about 80 percent by weight of the composite.

Typical of the processes contemplated herein are disproportionation of toluene to benzene and xylene, wherein the proportion of para-xylene obtained is greatly in excess of its normal equilibrium concentration. Such process if effectively carried out at a temperature of between about 400° C. and about 700° C. at a pressure between about 1 atmosphere and about 100 atmospheres utilizing a weight hourly space velocity of between about 1 and about 50.

Another charge stock suitable for use in the process of the invention is a stream high in $C_2$–$C_{15}$ olefin content. Thus, ethylene, propylene, butenes, pentenes, hexenes, dienes such as butadiene, pentadienes, cycloolefins such as cylopentene and cyclohexene, alkyl-substituted cyloolefins such as ethyl cyclopentene, cyclopentadiene and cylohexadiene can be effectively converted to a high yield of para dialkyl substituted benzenes utilizing the hereinabove described catalyst. Conversion utilizing such olefin feed is carried out at a temperature within the approximate range of 300° to 700° C., a pressure between atmospheric and 100 atmospheres employing a weight hourly space velocity between about 1 and about 1000. As source of the olefin reactant either substantially pure streams of the $C_2$–$C_{15}$ olefin may be employed or refinery or chemical streams high in such reactant, i.e. generally more than 25 volume percent may be used.

A still further charge stock which can be effectively use in the present invention to selectively produce para-dialkyl substituted benzenes containing alkyl groups of 1 to 4 carbon atoms includes paraffinic hydrocarbons having between 3 and 45 carbon atoms. Representative of such paraffins are butanes, pentanes, hexanes, heptanes, octanes, dodecanes, eiconsane, dotriacontane, tetracontane, and alkyl-substituted derivatives of these paraffins. Utilizing such paraffinic charge, reaction conditions include contact with the large crystal size crystalline aluminosilicate zeolite catalyst at a temperature of between about 400° to 700° C., a pressure between about atmospheric and about 100 atmospheres and a weight hourly space velocity between about 0.1 and about 100.

The use of mixed aromatics as feed is also feasible. For example, a mixture of ethylbenzene and toluene is converted selectively to a mixture rich in p-diethylbenzene and p-ethyltoluene, the latter predominating at high toluene to ethylbenzene ratios in the feed.

Reaction of benzene, toluene, ethylbenzene, propylbenzene or butylbenzene with $C_2$-$C_{20}$ olefins or $C_5$-$C_{25}$ paraffins at 250° to 500° C. yields p-dialkyl benzenes. This reaction is preferably carried out under pressure greater than 200 psig.

For example, benzene and ethylene at a mole ratio of 1:2 to 10:1 yield p-diethylbenzene besides ethylbenzene. (p=400 psig, Temp.=800° F.); toluene and 1-octene yield p-ethyltoluene and a mixture of n- and isopropyl toluene rich in p-isomer.

In the absence of added aromatics, $C_2$-$C_{15}$ olefins and $C_3$-$C_{44}$ paraffins each yield a mixture of aromatics rich in p-dialkylbenzenes. The olefins and the higher paraffins are more reactive and require lower severity of operation, e.g. a temperature of 250°-600° C., and preferably 300° C.-550° C., while the lower paraffins, e.g. $C_3$-$C_5$ paraffins yield aromatics at a practical rate only above 400° C. The aromatization can be carried out at atmospheric pressure or at elevated pressure; low pressure hydrogen can be used to retard catalyst aging, but high hydrogen partial pressure above 200 psig diminishes aromatics formation. Production of p-dialkylated benzenes containing alkyl groups greater than $C_1$ is favored by higher pressure and lower temperature. For example, p-ethyltoluene is formed from either dodecane or 1-butene at 400° C., whereas p-xylene is the preferred dialkylbenzene formed at higher temperature.

In order to more fully illustrate the nature of the invention and the manner of practicing the same, the following examples are presented.

EXAMPLE 1

A silicate solution was made by mixing 6872 g of Q-brand sodium silicate (28.5% $SiO_2$, 8.9% $Na_2O$), 3976 g of $H_2O$ and 20 g of Daxad 27, a surfactant. The specific gravity of the solution at 60° F. was 1.297. An acid alum solution was made by mixing 238 g of $Al_2(SO_4) \times H_2O$. (17.2% $Al_2O_3$), 574 g of $H_2SO_4$ (100%) 1200 g of TMACL (50% wt.), 1200 g of $H_2O$ and 3200 g of TPABr solution obtained by prereacting a mixture of equivalent amounts of tri-n-propylamine and n-propylbromide (the nitrogen content of the pre-reacted organic mixture was 1.43% wt). This will be referred to in the remaining examples as "pre-reacted organics". The specific gravity was 1.102 at 60° F.

The silicate and acid alum solutions were charged simultaneously into a 5-gallon capacity autoclave to form a gel. The gel was stirred at room temperature for a half hour into a uniform mixture. The crystallization was carried out at 320° F. with 90 rpm agitation. The time required to complete the crystallization was about 23 hours. The filtered, washed and dried solid product was shown by X-ray analysis to be 115% ZSM-5 and had a $SiO_2$ to $Al_2O_3$ ratio of 77.5. The crystallite size was determined by scanning electron microscope (SEM) and was found to be in the range of $12X7X5\mu$ to $2X2X1\mu$.

EXAMPLE 2

A silicate solution was made by mixing Q-brand sodium silicate, Daxad 27 and $H_2O$ as described in Example 1. An acid alum solution was made by mixing 238 g. of $Al_2(SO_4)_3 \times H_2O$ (17.2% $Al_2O_3$), 570 g. of $H_2SO_4$ (100%), 1345 g. of TEABr, 1175 g. of $H_2O$ and 3680 g. of pre-reacted organics (1.22% N by wt). The solutions were mixed, gel-whipped and heated to 320° F. with 90 rpm agitation. It took 12 hours to complete the crystallization. The washed and dried product was 110% ZSM-5, determined by X-ray diffraction. The $SiO_2$ to $Al_2O_3$ ratio of the product was found to be 71.1. The crystal size ranged from $8X5X4\mu$ to $1.5X1X1\mu$ as shown by SEM pictures.

EXAMPLE 3

A silicate solution was made by mixing 1374 g of Q-brand sodium silicate, 800 g of $H_2O$ and 4 g. of Daxad 27. An acid alum was made by mixing 47.6 g. of $Al_2(SO_4)_3 \times H_2O$ (17.2% $Al_2O_3$), 114 g. of $H_2SO_4$ (100%), 200 g. of CsCl, 800 g. of $H_2O$ and 640 g. of TPA solution (see Example 1 for content). The two solutions were mixed into a gel and an additional 100 g. of CsCl was added into the gel. The crystallization was completed within 14 hours at 320° F. with constant agitation. The product was 95% ZSM-5 and had a silica-to-alumina ratio of 62.3. The crystallite size was determined by SEM to be in the range of $7X6X3\mu$ to $2X2X1\mu$.

EXAMPLE 4

A silicate solution was made according to Example 2. An acid alum solution was prepared by mixing 238 g. $Al_2(SO_4)_3 \cdot \times H_2O$ (17.2% $Al_2O_3$), 574 g. $H_2SO_4$, 239 g. KCl, 1400 g $H_2O$ and 3756 pre-reacted organics (1.45% N by wt.). The solutions were charged into a 5 gallon capacity autoclave at the same time to form a gel. The gel was whipped for half an hour at 250 rpm. The crystallization was completed within 20 hours at 320° F. and 90 rpm agitation. The washed and dried product was found to be 115% ZSM-5 and had a $SiO_2$ to $Al_2O_3$ ratio of 73.8. The crystal size range was shown by SEM to be $0.7X0.7X0.1\mu$ to $0.4X0.3X0.1\mu$.

EXAMPLE 5

A silicate solution was made by mixing Q-brand sodium silicate, $H_2O$ and Daxad 27 according to example 1. An acid alum solution was made by mixing 238 g of $Al_2(SO_4)_3 \cdot \times H_2O$ (17.2% $Al_2O_3$), 574 g. of $H_2SO_4$ (100%), 136 g. of LiCl, 535 g. $H_2O$ and 4618 g. pre-reacted organics (1.22% N by wt.). The solutions were charged into a 5 gallon capacity autoclave to form a gel. The gel was whipped for half an hour at 250 rpm. The crystallization conditions were 320° F. and 90 rpm agitation. The crystallization was completed within 19 hours. The washed and dried product was found to be 115% ZSM-5 and had a $SiO_2$ to $Al_2O_3$ ratio of 68.6. The crystal size range was shown by SEM to be $0.5X0.3X1\mu$ to $0.3X0.2X0.1\mu$. Examples 4 and 5 demonstrate that added cations with ionic radii <1.4 produce ZSM-5 of crystal sizes <$1\mu$.

EXAMPLE 6

A silicate solution was made according to Example 1. An acid alum solution was made by mixing 238 g. of $Al_2(SO_4)_3 \times H_2O$ (17.2% $Al_2O_3$), 574 g. of $H_2SO_4$, 3000 g. of $H_2O$, 700 g. of TMACl (50%) and 1524 g. of pre-reacted organics (1.22% N by wt.). The calculated TPA to TMA mole ratio in the solution was 0.41. The solutions were charged into a 5 gallon capacity autoclave. The crystallization conditions were 320° F. and 90 rpm agitation. The crystallization was completed within 20 hours, the final product being found to contain 85% ZSM-5. The crystal size range was shown by SEM pictures to be $4X3X2\mu$ to $2X1X1\mu$.

EXAMPLE 7

A silicate solution was made according to Example 1. An acid alum solution was made by mixing 238 g. of $Al_2(SO_4)_3 \times H_2O$ (17.2% $Al_2O_3$), 574 g. of $H_2SO_4$, 185 g. of $H_2O$, 700 g. of TMACl (50%) and 4618 g. of pre-reacted organics (1.22% N by wt.). The calculated TPA to TMA mole ratio in the solution was 1.25. The solutions were charged into a 5 gallon capacity autoclave. The crystallization conditions were 320° F. and 90 rpm agitation. The crystallization was completed within 12 hours. The washed and dried product was found to be 115% ZSM-5. The crystal size range was shown by SEM pictures to be $13X10X6\mu$ to $2X2X1\mu$.

EXAMPLE 8

A silicate solution was made by mixing 90.9 lbs of Q-brand sodium silicate, 120 g. of Daxad 27 and 44.6 lbs $H_2O$. An acid alum solution was made by mixing 1428 g. of $Al_2(SO_4)_3 \times H_2O$ (17.2% $Al_2O_3$), 3444 g. of $H_2SO_4$, 4200 g. of TMACl (50%) and 79.0 lbs of pre-reacted organics (1.58% N by wt.). The calculated TPA to TMA mole ratio was 2.1. The above solutions were charged into a 30 gallon autoclave containing 1180 g. of $H_2O$. The charging was done by feeding the solutions through a mixing nozzle simultaneously. The gel was whipped for one hour at 90 rpm and at room temperature. The crystallization conditions were 320° F. with 90 rpm agitation. The crystallization was completed within 21 hours. The washed and dried product was found to be 90% ZSM-5 and had a $SiO_2$ to $Al_2O_3$ ratio of 74.1. The crystal size range was shown by SEM pictures to be $20X12X5\mu$ to $4X3X2\mu$. From Examples 6 to 8, we found the maximum crystal size increase from $4X3X2\mu$ to $20X12X5\mu$ as the ratio of TPA to TMA mole ratio increased from 0.41 to 2.1.

EXAMPLE 9

A silicate solution was made by mixing 90.9 lbs of Q-brand sodium silicate, 118 g of Daxad 27 and 52.6 lb of $H_2O$. An acid alum solution was made from 238 g. of $Al_2(SO_4)_3 \times H_2O$ (17.2% $Al_2O_3$), 3444 g. of $H_2SO_4$, 15.9 lb of $H_2O$, 7200 g. of TMACl (50%) and 42.3 lb of pre-reacted organics (1.47% N by wt.). The above solutions were charged into a 30 gallon autoclave containing 1180 g. of $H_2O$. The charging was done by feeding the solutions through a mixing nozzle simultaneously. The gel was then whipped for one hour at 90 rpm and at room temperature. The crystallization conditions were 320° F. with 90 rpm agitation. The crystallization was completed within 17 hours. The crystallinity of the washed and dried product was 130% ZSM-5 and it had a $SiO_2$ to $Al_2O_3$ ratio of 270. The crystal size was shown by SEM to be $7X5X3\mu$ to $2X1.5X1\mu$.

EXAMPLE 10

A silicate solution was made according to Example 9. An acid alum solution was made by mixing 2856 g. of $Al_2(SO_4)_3 \times H_2O$ (17.2% $Al_2O_3$), 2837 g. of $H_2SO_4$, 16.4 lb of $H_2O$, 842 g. TMACl (50%) solution and 39.6 lb of pre-reacted organics (1.51% N by weight). The gel forming, mixing and crystallization steps were all identical to those of Example 9. The crystallization took 30 hours to complete. The washed and dried product was 125% ZSM-5 having a $SiO_2$ to $Al_2O_3$ ratio of 37.3. The crystal size range was found by SEM pictures to be $11X8X4\mu$ to $0.5X0.5X0.3\mu$.

EXAMPLE 11

A silicate solution was made by mixing 45.5 lbs of Q-brand sodium silicate, 60 g. of Daxad 27 and 52.6 lbs of $H_2O$. An acid alum solution was made by mixing 714 g. of $Al_2(SO_4)_3 \times H_2O$ (17.2% $Al_2O_3$), 1785 g. of $H_2SO_4$, 44.4 lbs of $H_2O$, 8424 g. of TMACl (50%) solution and 39.5 lbs of pre-reacted organics (1.51% N by wt.). The gel forming, mixing and crystallization steps were all identical to those of Example 9. The crystallization took 43 hours to complete. The washed and dried product was 85% ZSM-5 and had a $SiO_2$ to $Al_2O_3$ ratio of 71.3. The crystal size range was found by SEM picture to be $20X8X4\mu$ to $0.7X0.5X0.2\mu$.

EXAMPLE 12

A silicate solution was made according to Example 11. An acid alum solution was made by mixing 357 g. of $Al_2(SO_4)_3 \times H_2O$ (17.2% $Al_2O_3$), 1962 g. of $H_2SO_4$, 44.4 lbs of $H_2O$, 8424 g. of TMACl (50%) solution and 39.5 lbs of pre-reacted organics (1.45% N by wt.). The gel forming, mixing and crystallization steps were all identical to those of Example 9. The crystallization was completed within 50 hours. The washed and dried product was 110% ZSM-5 and had a $SiO_2$ to $Al_2O_3$ ratio of 139.9. The crystal size range was found by SEM to be $25X8X4\mu$ to $6X3X1\mu$.

EXAMPLE 13

An alum solution was made by mixing 238 g. of $Al_2(SO_4)_3 \times H_2O$ (17.2% $Al_2O_3$), 202 g. of $H_2SO_4$, 400 g. of NaOH, 1200 g. of TMACl (50%) solution and 3682 g. of pre-reacted organics (1.22% N by wt.). The above solution was charged into a 5 gallon autoclave and 2132 g. of Hi-Sil (a form of precipitated $SiO_2$) was added to the solution. The mixture was crystallized at 320° F. with 90 rpm. The crystallization was completed within 114 hours. The washed and dried product was 100% ZSM-5 and had a $SiO_2$ to $Al_2O_3$ mole ratio of 65.2. The crystal size was measured by SEM to be from $20X10X5\mu$ to $8X6X4\mu$.

EXAMPLE 14

A silicate solution was made according to Example 1. An acid alum solution was made by mixing 238 g. of $Al_2(SO_4)_3 \times H_2O$ (17.2% $Al_2O_3$), 574 g. of $H_2SO_4$, 1200 g. of TMACl (50%) solution and 3480 g. of $H_2O$. The two solutions were charged to the 5 gallong autoclave simultaneously to form a gel. After the gel was whipped for one half hour at 250 rpm and room temperature, 1148 g. of n-propylamine was added. The autoclave was again sealed. The crystallization took 31 hours to complete at 320° F. and 90 rpm agitation. The washed and dried product was found to be 80% ZSM-5 having a $SiO_2$ to $Al_2O_3$ ratio of 62.8. The sodium content of the product was 0.4, which is lower than regular ZSM-5 products. The crystal size range was estimated by electron microscopy to be 10X4X4$\mu$ to 2X1X1$\mu$.

EXAMPLE 15

A silicate solution was made according to Example 9. An acid alum solution was made by mixing 1428 g. of $Al_2(SO_4)_3 \times H_2O$ (17.2% $Al_2O_3$), 3444 g. of $H_2SO_4$, 7200 g. of TMACl (50%) solution and 46.1 lbs of $H_2O$. The above solutions were charged into a 30 gallon autoclave and mixed into the same homogeneous gel mixture as that described in Example 9. Then 3005 g. of tri n-propylamine and 2584 g. of n-propylbromide were added on top of the gel. The mixture was crystallized at 320° F. and 90 rpm agitation. The crystallization took 18.3 hours. The washed and dried product was found to be 105% ZSM-5 and to have a $SiO_2$ to $Al_2O_3$ mole ratio of 73.9. The crystal size was measured by SEM to be 15X12X6$\mu$ to 1X0.7X0.5$\mu$.

EXAMPLE 16

A silicate solution was prepared by mixing 90.9 lbs of Q-brand sodium silicate, 118 g. of Daxad 27 and 52.6 lbs of $H_2O$. An acid alum was prepared by mixing 1430 g. of $Al_2(SO_4)_3 \times H_2O$ (17.2% $Al_2O_3$), 3440 g. of $H_2SO_4$, 1840 g. of NaCl, 20.8 lbs of pre-reacted TPABr solution (1.43% N by wt.) and 38.9 lbs of $H_2O$. The above two solutions were charged through a mixing nozzle into a 30 gallon autoclave to which has been added 1180 g. of $H_2O$. After the gel was formed, 5840 g. of NaCl was added into the gel. The autoclave was sealed and heated to 320° F. as soon as possible. The agitation speed was set at 90 rpm. The crystallization took about 10 hours to complete. The washed and dried product was 100% ZSM-5 with a silica to alumina ratio of 66.2. The crystal size was small, as shown by transmission electromicroscopic picture to be 0.3X0.2$\mu$ to 0.1X0.05$\mu$.

This example is a typical ZSM-5 preparation and serves as a base case to show the importance of the effect of additional cations such as TMA, TEA, cesium and rubidium, crystal size.

We claim:

1. In a method of preparing a crystalline aluminosilicate zeolite having a $SiO_2$ to $Al_2O_3$ molar ratio of from about 25 to about 1000 and a Constraint Index of from 1 to 12 from an aqueous reaction mixture comprising sources of silica, alumina and alkylammonium cations and metal cations, the improvement which comprises having in the reaction medium for which said zeolite is prepared, metal cations having an ionic radius of from 1.40 Å to the pore size of the specific zeolite whereby the crystal size of the zeolite product in increased to at least 1 micron.

2. The method of claim 1 wherein the alkylammonium cations comprise tetramethylammonium, tetraethylammonium or tetrapropylammonium cations.

3. The method of claim 2 wherein the alkylammonium cations comprise tetramethylammonium cations.

4. The method of claim 2 wherein the alkylammonium cations comprise tetraethylammonium cations.

5. The method of claim 2 wherein the alkylammonium cations comprise tetrapropylammonium cations.

6. The method of claim 1 wherein the metal cations comprise cesium or rubidium cations.

7. The method of claims 3, 4 or 5 wherein the metal cations comprise cesium cations.

8. The method of claims 3, 4 or 5 wherein the metal cations comprise rubidium cations.

9. The method of claim 1 wherein said zeolite is selected from the group consisting of ZSM-5, ZSM-11, ZSM-12, ZSM-35 and ZSM-38.

10. The method of claim 9 wherein said zeolite is ZSM-5.

* * * * *